Jan. 11, 1938.　　　E. G. McCAULEY　　　2,105,196
BRAKE OPERATING MECHANISM
Filed May 20, 1931　　　2 Sheets-Sheet 1
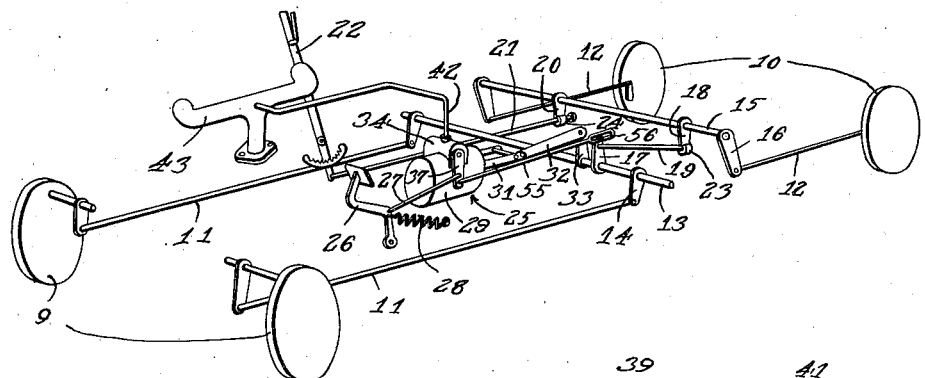
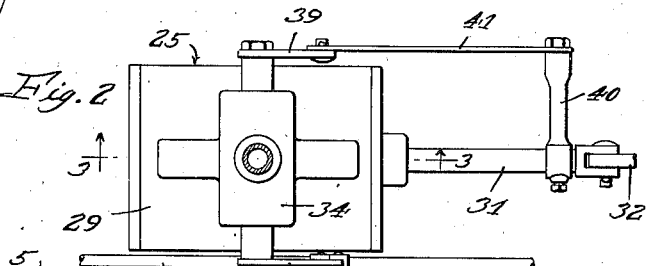
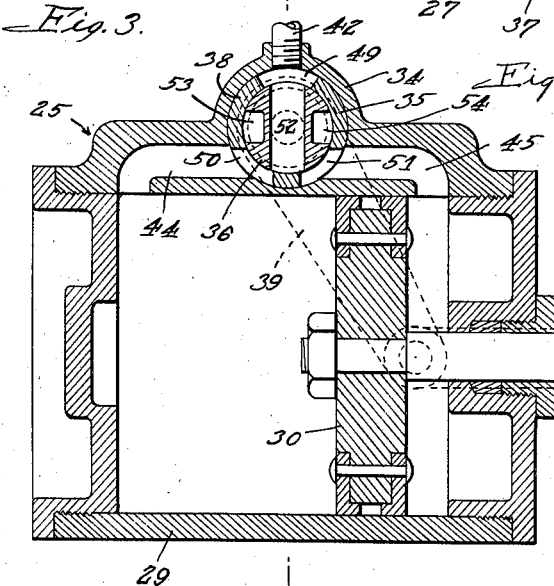
Inventor
E. G. McCauley Jan. 11, 1938.    E. G. McCAULEY    2,105,196
BRAKE OPERATING MECHANISM
Filed May 20, 1931    2 Sheets-Sheet 2

Inventor:
E. G. McCauley
By Wilson, Dowell, McCanna & Rehm
Attys.

Patented Jan. 11, 1938

2,105,196

UNITED STATES PATENT OFFICE 2,105,196

BRAKE OPERATING MECHANISM

Ernest G. McCauley, Pittsburgh, Pa.

Application May 20, 1931, Serial No. 538,689

8 Claims. (Cl. 188—152)

This invention relates generally to mechanisms operable by atmospheric pressure and, for the sake of convenience, referred to as vacuum or suction-operated mechanisms, and is more particularly concerned with a brake operating mechanism of that description suitable for automobiles and other vehicles.

The primary object of my invention is to provide a mechanism having a movable part operable by suction in either direction by a reversible valve which controls the suction so that atmospheric pressure is applicable to either side of a piston or diaphragm in the mechanism to operate same in either direction.

Another object is to provide in a suction-operated mechanism a movable part adapted to move in either direction under atmospheric pressure in synchronous relation to an operating device that is arranged to be moved manually for actuation of the mechanism. More specifically stated, I provide a two-part rotary valve controlling the communication of a suction line with the working cylinder and have the one part of said valve arranged to be turned in either direction manually to open communication with either end of the cylinder, and have the other part connected so as to turn in the movement of the movable part, whereby to cause the movable part not only to move in either direction in synchronous relation to the operating device, but also proportionally to its movement. With this arrangement it will be seen that I provide not only instantaneous application of the brakes to whatever degree desired, but also provide for positive release of the brakes, because the manually operated part of the valve moves with the foot pedal in one direction upon depression of the pedal, and in the opposite direction upon return thereof. The positive release of the brakes means freedom from drag on the brake drums and, hence, fuel economy and longer life for the brakes.

It is another object of my invention to provide a mechanism so connected with the brake rigging as to permit application of the brakes manually, or by power, or both. Thus, the brakes can be applied on a parked car by means of the emergency lever in the usual way and can be applied by means of the foot pedal when the car is in motion if the brake suction operating mechanism should for any reason be thrown out of commission and, of course, either of these manually operated devices could be used to supplement the power operation of the brakes should the occasion ever arise.

The invention is illustrated in the accompanying drawings, in which—

Figure 1 is a diagrammatic view in perspective of an automotive braking system embodying brake suction operating mechanism in accordance with my invention;

Fig. 2 is a plan view of the mechanism itself;

Fig. 3 is a longitudinal vertical section on the line 3—3 of Fig. 2 made on an enlarged scale;

Fig. 4 is a similar section of a mechanism of a modified or alternative construction;

Similar reference numerals are applied to corresponding parts throughout the views.

Figure 5:
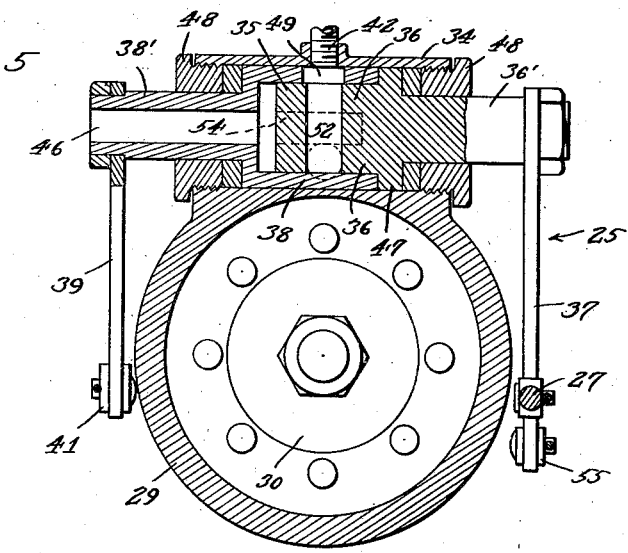
Fig. 5 is a cross-section on the line 5—5 of Fig. 3.
Figure 6:
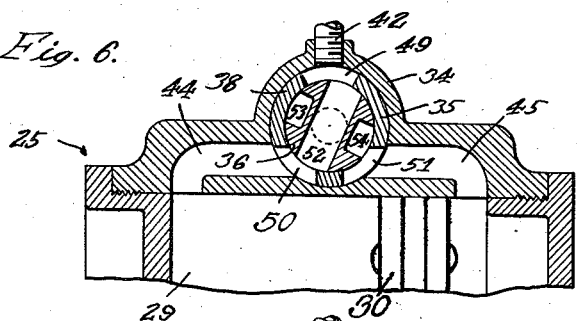
Figs. 6, 7 and 8 are views similar to Fig. 3 but showing the parts in different positions.

Referring to Figure 1, the numeral 9 designates the brakes for the front wheels of a car, and 10 the brakes for the rear wheels. The brakes 9 are operable in the usual way by means of rods 11, and the brakes 10 by rods 12. The brakes 9 and 10 may be of any suitable or preferred type. A rock shaft 13, suitably supported crosswise on the frame of the vehicle, has lever arms 14 projecting downwardly therefrom and connected with the rods 11. Another rock shaft 15, similarly supported on the frame, is likewise connected with the rods 12 by means of lever arms 16. It is customary to provide an upwardly projecting lever arm 17 on the shaft 13, and a downwardly projecting lever arm 18 on the shaft 15, the free ends of which are interconnected by a rod 19 so that rocking of the shaft 13 in one direction will cause the shaft 15 to be rocked in the opposite direction, whereby to apply the brakes 9 and 10 substantially simultaneously or as nearly so as desired. It is also customary to provide another downwardly projecting lever arm 20 on the shaft 15 connected by means of a rod 21 with the lower end of the emergency brake lever 22. The connections at 23 and 24 are of a lost motion type permitting the rocking of the shaft 15 by a pull upon either of the rods 19 and 21 without movement of the other rod. The brake rigging thus far described is more or less conventional in four wheel brake systems, and no invention is claimed therein, excepting only in so far as certain features thereof cooperate in a special way with the brake operating mechanism of my invention, which will now be described.

The brake operating mechanism of my invention is indicated generally by the reference numeral 25, and may be said to be interposed between the lever arm 17 previously referred to and the brake pedal 26 to which said lever arm is otherwise directly connected, usually by means of a rod connected to the pedal where the rod 27 is shown. A coiled tension spring 28 is illustrated in connection with the pedal 26 for returning the same to neutral position after depression thereof. Both pedal 26 and spring 28 are suitably mounted on the vehicle in conventional manner. The mechanism 25, briefly stated, comprises a working cylinder 29 arranged to be suitably supported on the frame of the vehicle and having a piston 30 reciprocable therein and attached to the inner end of a piston rod 31 which projects from the cylinder and has connection by means of a link 32 with a lever arm 33 that is a companion to the lever arm 17 previously referred to, and projects upwardly from the rock shaft 13. A valve cage 34, suitably formed integral with the top wall of the cylinder 29, contains a two-part rotary valve 35, the center plug part 36 of which is arranged to be oscillated by means of a lever arm 37 connected with the brake pedal 26 by means of the rod 27. The outer sleeve part 38 of the valve 35 is arranged to be oscillated by means of a lever arm 39 connected to an arm 40 reaching laterally from the piston rod 31, by means of a rod 41. The valve cage 34 has a rigid suction line connected with the top thereof as at 42, the line 42 having communication with the intake manifold 43 of the engine forming the power plant for the vehicle. Two passages 44 and 45, suitably cored in the wall of the cylinder 29, communicate with the opposite sides of the valve cage 34 at the bottom thereof and reach to the opposite ends of the cylinder, as shown. Now, it will be seen in Fig. 5 that the sleeve part 38 of the valve 35 has its stem 38' provided with a longitudinal passage 46 to leave the inside of the sleeve open to the atmosphere. The plug part 36 has a solid stem 36'. The two parts 36 and 38 telescope on one another, the extent to which the part 36 can be entered into the part 38 being limited by the annular flange 47 thereon, so as to leave the inner end of the passage 46 uncovered. Packing nuts 48, slipped over the projecting ends of the valve stems 36' and 38', thread into the opposite ends of the valve cage 34 and compress the packing material in the cage at opposite ends of the valve to hold the valve parts in the relationship shown, and also make the valve cage air-tight. There are three ports 49, 50 and 51 in the sleeve part 38 of the valve establishing communication with the suction line 42 and passages 44 and 45, respectively, as clearly appears in Figs. 3 and 6-8. A transverse hole 52 is provided in the plug part 36 and always registers more or less with the port 49 at its upper end and at its lower end with either the port 50 or 51, or both, whereby to exhaust the air from either end of the working cylinder 29 to cause the piston 30 to move in either direction. Longitudinal grooves 53 and 54 are provided in opposite sides of the plug part 36 in such relation to the ports 50 and 51 as to be out of communication with said ports when the hole 52 is establishing suction with both ends of the cylinder, but arranged so that the one groove communicates with the port adjacent thereto when the hole 52 is establishing suction communication through the other port with one end of the cylinder, and vice versa. The grooves 53 and 54 communicate with the atmosphere through the passage 46 and are, hence, arranged to open either end of the working cylinder to the atmosphere by coming into register with the ports 50 and 51, respectively. Manifestly, when one end of the cylinder is in communication with the suction line and the other end with the atmosphere, the piston will move toward the first end under atmospheric pressure. There is, of course, always more or less of a reduction in pressure in the intake manifold 43, but the greatest reduction occurs when the engine is suddenly throttled while running at a high or moderately high speed as occurs on most every occasion when it is desired to stop the car. Hence, knowing what the average atmospheric pressure is, it will be appreciated what formidable operating force there is to be dealt with in a brake operating mechanism such as I have just described, especially if the piston is provided of a diameter large enough to afford a sufficient pressure area. With the parts proportioned properly, one does not have to rely upon a very great reduction in pressure in the intake manifold to secure the desired brake operating force. It will be observed that a rod 55 is provided affording a connection between the arm 37 and the lever arm 17 and that one end of this connection, as appears at 56, allows for a certain amount of lost motion between the lever arm 37 and lever arm 17 for a purpose that will soon appear. The brake pedal 26 is, in other words, actually connected with the brakes to permit manual operation thereof, but an auxiliary connection is provided between the brake pedal and the control valve of a brake operating mechanism for normally applying the brakes by power.

Figure 7:
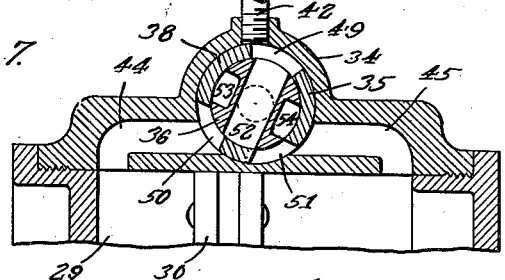
Figure 8:
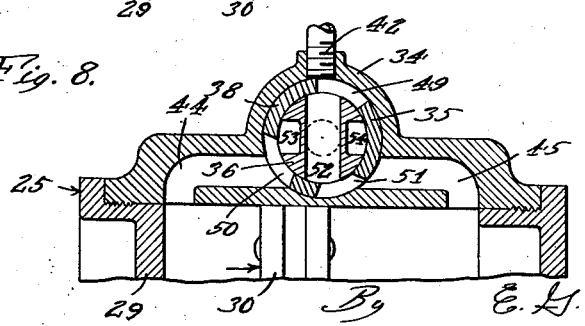

In operation, so long as the engine is running there is a reduction in pressure in the intake manifold 43 to take care of the operation of the brake operating mechanism 25. When the brake pedal 26 is depressed, the plug part 36 of the valve 35 is turned in a clockwise direction from the position shown in Fig. 3 to that shown in Fig. 6 thereby establishing suction communication with the left end of the working cylinder 29 through ports 49 and 50 and passage 44, and opening the right end to the atmosphere through groove 54, port 51 and passage 45. The piston 30, therefore, immediately moves to the left under atmospheric pressure, as indicated by the arrow. In moving to the left, the piston, through its rod 31 and link 32, applies the brakes 9 and 10 by oscillation of the rock shaft 13 by means of lever arm 33. Movement of the piston 30 causes turning of the sleeve part 38 of the valve 35 by reason of the connection of its lever arm 39 with the piston rod 31. The plug part turns in a clockwise direction and, hence, simultaneously causes the movement of the sleeve part. When the sleeve valve reaches the position shown in Fig. 7, providing a partly operated position of the piston, the atmosphere connection through groove 54 and port 51 with the right end of the cylinder through passage 45 is cut off, and simultaneously the port 52 will open into port 50, which may be considered a lapped position of the valves 35 and 36, at the point of engagement of the brakes with the drums. When the piston 30 is in position as shown in Fig. 7 it can be assumed that the brakes are partly operated and at the point of engagement with the brake drums on the wheels. Thus upon further movement of brake pedal 26 to apply and hold the brakes causes the hole 52, port 50 and passage 44 to have connection with the suction, while groove 54, port 51 and passage 45 are connected to the atmosphere, thus tending to further apply the brakes to the extent of the amount of opening that valve 36 and groove 54 is opened to the atmosphere, which in turn causes the plug 36 to move to a greater amount than the sleeve 35, which sleeve 35 is moved by the piston, and since the piston having the brakes engaged against the drums cannot move substantially any farther, but permits more pressure to be applied by the atmosphere, as the suction will be maintained on the opposite side of the piston by hole 52 and port 50. It will thus be seen that the operation of the brakes to be applied gradually or full on is governed by the extent or amount of opening to the atmosphere through the groove 54 and port 51, since the suction will be applied on the opposite side at all times. Obviously, it requires only very gentle foot pressure on the brake pedal to apply the brakes, since the pedal only operates part of the valve and is moved against the slight resistance of the spring 28. Obviously, if the pedal is moved a certain distance for light application of the brakes, the valve will be movable a proportionately small amount, and there will be a proportionately small amount of movement of the piston. However, after such application of the brakes, the brakes can be applied more heavily by simply moving the brake pedal a trifle farther. The piston, in other words, operates in synchronous relation to the control valve and pedal and responds instantly to movement of the pedal, and, to an extent proportionate to the movement of said pedal up to the point of engagement of the brakes with the drums, whereupon further movement of the pedal will tend to gradually admit more atmosphere to the right side of the cylinder and against the piston, while simultaneously the suction on the opposite side will be gradually increased correspondingly to apply the brakes to a greater extent. When the brake pedal is released it is obvious that the spring 28 will return it to its normal position, and the plug part 36 of the valve will accordingly be moved in a counterclockwise direction from the position shown in Fig. 7 back to the position shown in Fig. 3, thereby bringing it into the relationship with the sleeve part 38 shown in Fig. 8, in which the right end of the cylinder 29 is shown as connected with the suction line through ports 49 and 51, while the left end is thrown open to the atmosphere through groove 53 and port 50. The piston 30 is accordingly moved to the right under atmospheric pressure, as indicated by the arrow. The brakes are, therefore, positively released by the brake operating mechanism in a manner similar to their positive application. The instantaneous release of the brakes upon return of the brake pedal is, of course, of considerable advantage from the standpoint that it eliminates any unnecessary drag on the movement of the car, and means a saving in fuel consumption as well as longer life for the brakes. In the movement of the piston to the right, the sleeve part 38 of the valve is moved in a counterclockwise direction by its lever arm 39, which, as stated before, is connected with the piston rod 31. When the sleeve part 38 comes to the position shown in Fig. 3, which is when the brakes are fully released, the atmosphere connection for the left end of the cylinder is broken by reason of the port 50 moving out of register with the groove 53, and finally, the both ends of the cylinder are placed in communication with the suction line to the same extent, thereby holding the piston 30 in the position shown. The control valve 35 also automatically operates, in the event the sleeve valve 38 tends to move past the predetermined position in either direction established by the actuation of the first mentioned valve member 36, which, will cause the valve to open to the suction line and atmosphere in such manner as to compensate for this extra movement and readjust the position of the suction mechanism to the desired position as held by the foot. This relationship between the valve and piston which causes the one to adjust its position to be in accord with the position of the other at all times is of advantage also in the event of any slight air leakage into the working cylinder. If a leak occurs sufficient to cause movement of the piston, it is obvious that the sleeve part 38 will be moved accordingly in the one direction or the other and cause the piston to be moved back to its original position by reason of atmospheric pressure on the one side and suction on the other side of the piston. In the event the suction line 42 is broken as, for example, due to vibration causing crystallization of the metal of the tube forming the line, it is apparent that there will be little or no resistance to the manual operation of the brakes, by virtue of the fact that the both sides of the piston are then subject to atmospheric pressure and the air in front of the piston is simply discharged through the broken suction line when the brake pedal is operated and the piston moved accordingly.

With a view to safety, it will be seen that if the brake operating mechanism 25 should for any reason fail to function when the car is in motion and it is desired to apply the brakes, the depression of the brake pedal 26 the normal distance would not result in application of the brakes, but would simply take up the lost motion at the connection 56 of the rod 55 with the lever arm 17. Then, further depression of the brake pedal to an extreme position, that is, down to the toeboard or thereabouts, would result in the application of the brakes entirely by foot pressure. There is, of course, little or no danger of the mechanism 25 being thrown out of commission, but it will be evident that an air leak into the suction line 42 would necessitate the operation of the brakes manually. The brakes 10 can also, of course, be applied by means of the emergency lever 22 suitably mounted on the vehicle entirely independently of operation of the mechanism 25, as for example, when the car is parked and the engine is not running, or if, while the car is in motion, the mechanism 25 fails to function for any reason, and it is desired to apply the brakes. In the event of the operation of the mechanism 25 being impaired by reason of one or more leaks thereon, it will be seen that the breaks can be applied partly under the force generated by the mechanism 25 and partly by foot pressure on the pedal. It will be seen, therefore, that I have taken care of all conditions that would possibly arise in operation.

In Fig. 4, there is illustrated a modified or alternative form of brake operating mechanism 25' in which a housing 29' takes the place of the working cylinder 29 and provides a working chamber therein for a flexible diaphragm 30'. The mechanism is otherwise like the mechanism 25 having a similar form of valve 35 with the plug part 36 thereof arranged to be oscillated by the brake pedal, and the sleeve part 38 thereof arranged to be oscillated in the movement of the rod 31. The establishing of suction communication with the housing on one side of the diaphragm and atmospheric communication on the other side naturally results in movement of the diaphragm similarly as in the case of the piston for application as well as release of the brakes.

It is believed the foregoing description conveys a good understanding of all of the objects and advantages of my invention. While I have repeatedly made reference to the use of the mechanism for operation of brakes on automobiles, it will, of course, be evident that the invention is not limited to such a specific application. It will also be apparent that the mechanism could readily be adapted for operating devices other than brakes. Furthermore, the mechanism is not limited to operation by atmospheric pressure, but should be looked upon in a broader sense as a pneumatically operable mechanism. The following claims have, therefore, been drawn so as to cover all legitimate modifications and adaptations.

I claim:

1. In combination, a suction source, a brake, a working chamber having a movable working element therein suitably connected with the brake, a rotatable two-part valve controlling communication between the suction source and the working chamber and between the working chamber and the atmosphere, so constructed and arranged to connect the chamber on one side of the working element with the suction source and simultaneously the chamber on the other side of the working element with the atmosphere, or vice versa, and a manually operable device for applying or releasing the brake and connected with the one part of the valve, to rotate said valve a predetermined distance for a predetermined movement of the device, the other part of said valve being arranged to be rotated in the operation of the working element, and automatically proportion the movement of the brake by the working element to the movement of the manually operated device in either direction.

2. In a braking system comprising one or more brakes, brake operating means, and a brake pedal normally arranged to operate the brake operating means, a suction source, and means interposed between the pedal and the brake operating means for operating the latter from the suction source under the control of said pedal, said means comprising a vacuum working chamber having a movable working element therein, and a valve integral with said chamber so constructed and arranged for controlling communication between the suction source and said chamber so that upon initial movement of the pedal one side of the working element is opened to the suction source and the other side is opened simultaneously to the atmosphere or vice versa, said valve having connections with said pedal and likewise with the working element for operation thereof, and said working element being connected with the brake operating means.

3. A braking system as set forth in claim 2, wherein the valve is of a reversible type arranged upon initial movement when moved in one direction to open one side of the working element to the suction source, and instantaneously the other side to the atmosphere, but when moved in the opposite direction to afford the reverse of such communication, and spring means for retaining the brake pedal in a neutral position, whereby to return same to such position after depression of the pedal.

4. A braking system as set forth in claim 2 wherein the valve comprises two parts arranged in different relative positions to open one side of the working element to the suction source, and the other side to the atmosphere, or vice versa, and wherein the one part is connected with the pedal so as to be actuated thereby in the initial movement thereof, and the other part is connected with the movable element so as to be actuated thereby in its movement, whereby to control the communication of said working chamber with the suction source and atmosphere so that the working element and brakes are given a predetermined movement proportionate to the movement of the pedal in either direction.

5. In combination, a suction source, a control medium, a working chamber having a movable element therein and connected with the control medium, a valve adapted to establish communication of said chamber with the suction to communicate movement to said movable element in either direction under atmospheric pressure, said valve having two rotary members, a manual operating device having an auxiliary lost motion mechanism for operating said control medium manually, said manual device being connected with one part of said valve members and to be moved manually, whereby to operate said movable element by suction simultaneously with the movement of said manual device, the other of said valve members being connected for rotatable movement with the movable element in either direction to control the operation of the control medium in relation to the manual device, independent of said lost motion mechanism.

6. In combination, a suction source, a control medium, a working chamber having a movable element therein and connected with the control medium, a valve adapted to establish communication of said chamber with the suction to communicate movement to said movable element in either direction under atmospheric pressure, said valve having two rotary members, a manual operating device having an auxiliary lost motion mechanism for operating said control medium manually, said manual device being connected with one part of said valve members and to be moved manually, whereby to operate said movable element by suction simultaneously with the movement of said manual device, the other of said valve members being connected for rotatable movement with the movable element in either direction to control the operation of the control medium in synchronous relation to said manual device, independent of said lost motion mechanism.

7. The combination in a motor vehicle of brake members, manual means for operating said brake members, suction actuated synchronous unit mechanism for pulling or pushing said brake members, and a double-acting rotary valve for controlling the suction actuated mechanism to operate the brake members on or off in either direction in positive synchronous relation and simultaneously to said manual means.

8. The combination in a motor vehicle of brake members, manual means for operating said brake members, suction actuated synchronous unit mechanism for pulling or pushing said brake members, and a double-acting rotary valve for controlling the suction actuated mechanism to operate the brake members on or off in either direction, in positive synchronous relation and simultaneously to said manual means, said valve comprising two members, one member being connected to the manual means to throw the suction actuated mechanism into operation, and the other member being movable in the operation of the mechanism to automatically proportion the movement of the suction actuated mechanism in relation to the movement of the manual means in either direction.

ERNEST G. McCAULEY.